United States Patent Office 3,482,711
Patented Dec. 9, 1969

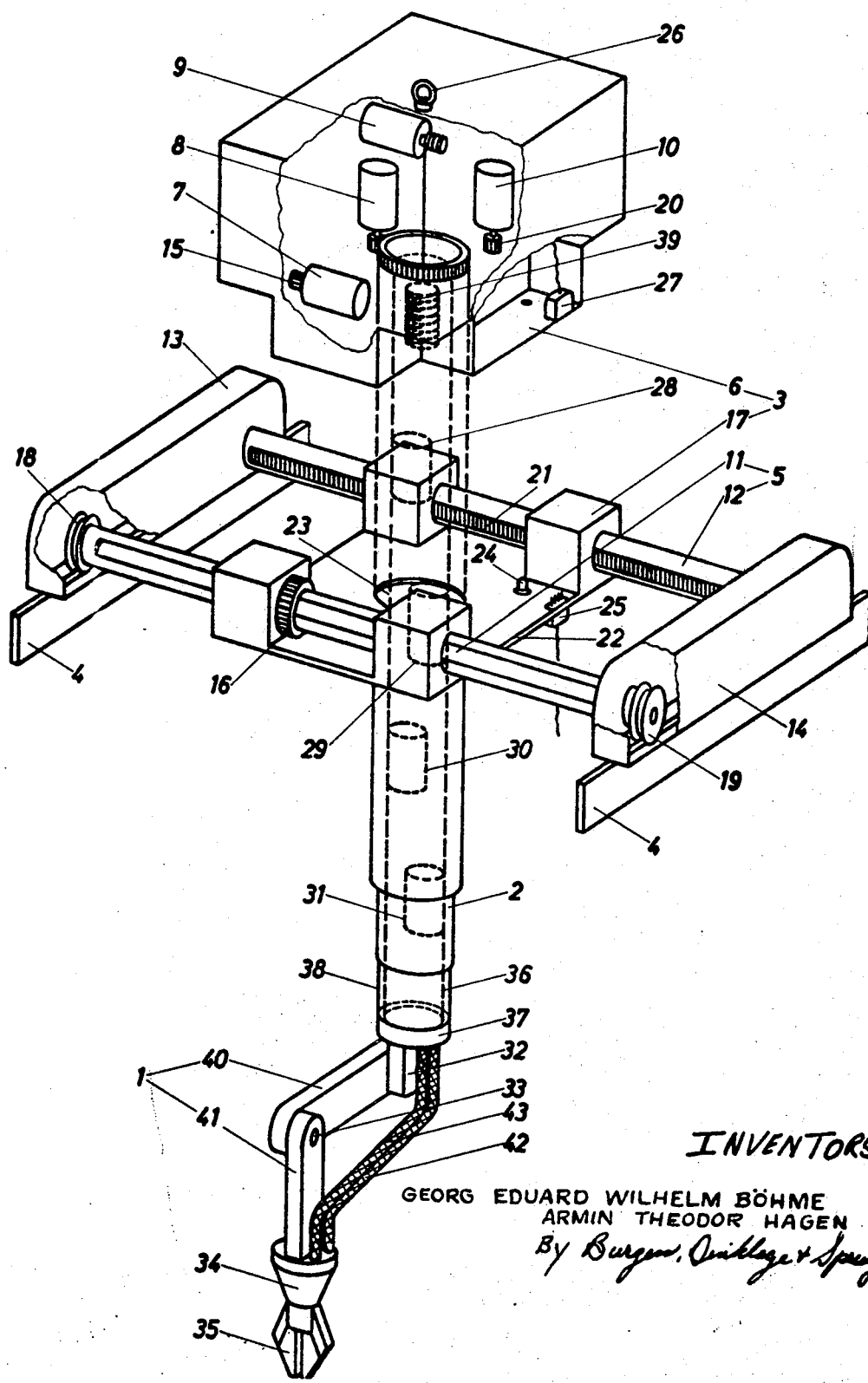

3,482,711
REMOTELY CONTROLLED MANIPULATOR
Georg Eduard Wilhelm Böhme, Leopoldshafen, and Armin Theodor Hagen, Karlsruhe, Germany, assignors to Gesellschaft für Kernforschung mbH, Karlsruhe, Germany
Filed Nov. 25, 1966, Ser. No. 596,964
Claims priority, application Germany, Nov. 30, 1965, G 45,314
Int. Cl. B25j 3/00; B66c 19/00
U.S. Cl. 214—1
9 Claims

ABSTRACT OF THE DISCLOSURE

Manipulator composed of tongs, a movable wrist joint, hingedly lower and upper arm sections, telescopic hoist means joined to said upper arm and a trolley means supporting the telescopic hoist, wherein the trolley means contains electrical drive motors used for imparting rotation and lift to the telescopic hoist and for driving the bridge and the trolley, and wherein the motors adapted to drive the manipulator are located in the telescopic hoist.

---

The invention relates to a remotely controlled manipulator driven by electric motors and having a manipulator arm which consists of tongs attached to a rotary wrist joint, a lower arm, an upper arm hinged to the lower arm by an elbow joint, and a shoulder joint the support of which is attached to a telescopic hoist for lifting and lowering the manipulator arm; the telescope is supported in a trolley so as to be movable around its longitudinal axis, the trolley may be moved along a movable bridge like a bridge crane.

Manipulators of this type designed in accordance with the shape and functions of the human arm are frequently employed in remote handling of the radioactive substances, e.g. in hot cells or nuclear reactors.

It is a familiar design to drive the individual elements of a manipulator by one electric motor attached to each of them; in most cases this motor will be arranged in the immediate vicinity of the element to be driven. The motions in this case are limited by limiting switches, the torques to be transmitted by magnetic or mechanic safety clutches. Particularly aggravating in the operation of a manipulator is the fact that components susceptible to failure or requiring maintenance can be reached only badly or, in some cases, not at all by remote control nor be replaced.

This invention has the aim of creating a manipulator in which components susceptible to operational disturbance, particularly those endangered by ironizing radiation, are combined in easily exchangeable units and in which the use of components requiring maintenance is avoided as much as possible.

This is attained in the invention by arranging all driving motors of the manipulator in an upper part of the trolley and the telescopic hoist and by making the upper part automatically lock and detach, respectively, on a trolley base movable on the bridge. In this way, all sensitive electrical and mechanical elements are advantageously combined in a very compact unit which can be lifted off the base by very simple means and, if necessary, be replaced by a new unit. In addition, this setup greatly reduces the radiation exposure to the motors, since they are set up a relatively large distance away from the emitters in the region of the manipulator tongs.

The motors driving the bridge, the trolley, and the motors for rotation and lift of the telescopic hoist are suitably arranged in the upper part of the trolley, the motors for the manipulator drive, however, in the telescopic hoist. The motors mentioned last are mounted on a common slide-in unit fixed to the support, which may be pushed into the end member of the telescopic hoist and is connected with it through the support so as to be detachable. In this way it is possible to disengage in a very simple manner the manipulator arm including its drive motors as one closed unit and, if necessary, replace it.

In a continued development of the invention the drive motors to be used are suggested to be short-circuit-proof DC series motors whose stop moment can be fixed by voltage and current limiters so that no additional limit switches and safety clutches are needed.

Further details of the invention are explained on the basis of the drawing:

According to this drawing the manipulator essentially consists of a manipulator arm 1, a telescopic hoist 2 composed of several tubes sliding one into the other, a trolley 3, and a bridge 5 movable on rails 4. The telescopic hoist 2 is supported in the upper part 6 of the trolley 3 so as to be movable around its longitudinal axis. Moreover, four motors 7, 8, 9 and 10 for the rotary and lifting motions of the telescopic hoist 2, and the movements of the trolley 3 and the bridge 5 are arranged in the upper part. The bridge is formed of two parallel tubes 11, 12 to the ends of which the track wheel boxes 13, 14 movable on rails 4 are attached. The drive of the bridge is actuated by the driving pinion 15 of motor 7 via a cogwheel 16 sliding along the longitudinal axis of the tube 11, which is supported in the movable base 17 of the trolley 3 and, e.g., may transfer a rotary motion through a flattening or a groove in tube 11 onto this tube and thus onto the rollers 18, 19 attached to it.

The trolley 3 can be driven through a driving pinion 20 of motor 10 which engages into a rack 21 in the tube 12.

The base 17 has a base plate 22 with an opening 23 for the penetration of the telescopic hoist 2 and the manipulator arm 1, several guide and stop members 24 and a plug 25 to which the current supply cable is connected. Now, if the upper part with the attached telescopic hoist and the manipulator arm is lowered from the top into the base 17, e.g. by a tackle engaging in the lug 26, the stop members 24 engage into corresponding counter profiles in the upper part 6 and, at the same time, a socket 27 attached to the upper part engages in socket 25, and the driving pinions 15 and 20, respectively, engage in the matching counter profiles of the cogwheel 16 and the rack 21, respectively. Motors 28, 29, 30, and 31 for the drive of the shoulder joint 32, the elbow joint 33, the wrist joint 34, and the tongs 35 are mounted on a slide-in unit 36 which is rigidly connected with the support 37. The support proper is fastened to the end members 38 of the telescopic hoist 2. The current supply to the motors 28, 29, 30, and 31 is fed from the upper part 6 via slip ring contacts 39. In the example shown the shoulder joint 32 for the motion of the upper arm 40 and the elbow joint for the motion of the lower arm 41 can be driven by chains (not shown in the drawing), the movable wrist joint 34 and the grip 35 by flexible shafts 42, 43.

The individual motions of the manipulator can be started and controlled from a control console (not shown in the drawing) by remote action.

We claim:
1. Remotely controlled manipulator driven by electric motors and having a manipulator arm comprising tongs attached to a movable wrist joint, a lower arm, an upper arm hinged to the lower arm by an elbow joint, the upper arm having a shoulder joint the support of which is fixed to a telescopic hoist for lifting and lowering the manipulator arm, the telescoping hoist being supported in an upper part of a trolley so as to be movable around its longitudinal axis, said upper part of the trolley being automatically locked and detached, respectively, on a trolley base part movable along a movable bridge like a bridge crane, in said trolley being arranged electrical drive motors of the manipulator for imparting rotation and lift to the telescopic hoist and for driving the bridge and the trolley, and in said hoist are arranged motors adapted to drive said manipulator arm.

2. Remotely controlled manipulator as claimed in claim 1, wherein the drive motors attached to the driving system of the bridge, the trolley, the telescopic hoist and for the rotation of the telescopic hoist are arranged in the upper part of the trolley, and the motors driving the tongs, the wrist joint, the lower arm, the elbow joint, and the upper arm of the manipulator arm are arranged in the telescopic hoist.

3. Remotely controlled manipulator as claimed in claim 1, in which the motors arranged in the telescopic hoist are mounted on one common slide-in unit connected to said support, and said slide-in unit being introduced into the end member of the telescopic hoist and connected with it and the support so as to be detachable.

4. Remotely controlled manipulator as claimed in claim 1, in which the drive motors are shortcircuitproof DC series motors, whose stop moment can be set by voltage and current limiters.

5. Remotely controlled manipulator as claimed in claim 1, wherein the bridge comprises two parallel tubes for supporting and guiding the trolley, one tube of which being movable around its longitudinal axis to drive the bridge rollers, whereas the other tube has a rack in which a driving pinion of the motor attached to the upper part of the trolley engages to move the trolley along the tubes.

6. Remotely controlled manipulator as claimed in claim 5, comprising an arrangement of a cogwheel on the rotary supported tube, which is displaceable along the axis of the tube, connected with it in a torsion-resistant way and supported in the base of the trolley and can be driven through a driving pinion of a motor attached to the upper part of the trolley.

7. Remotely controlled manipulator as claimed in claim 1 wherein the trolley base part comprises a baseplate with an opening through which the manipulator arm and the telescopic hoist can penetrate, and various guide and stop members and a plug to which a current supply cable is connected being attached at the baseplate and at the manipulator arm, respectively.

8. Remotely controlled manipulator as claimed in claim 6 in which the upper part of the trolley has counter profiles corresponding to the stop members so that after lowering of the upper part of the trolley onto the base-part a socket arranged on the upper part will engage in a plug, and the pinions will mesh with the cogwheel and a rack, respectively.

9. Remotely controlled manipulator as claimed in claim 1, comprising means for driving the shoulder joint and the elbow joint by chains, the rotary wrist joint and the tongs by flexible shafts.

References Cited
UNITED STATES PATENTS

| | | | |
|---|---|---|---|
| 2,882,094 | 2/1958 | Greer | 214—1 |
| 3,066,805 | 12/1962 | Sullivan | 214—1 |

GERALD M. FORLENZA, Primary Examiner

GEORGE F. ABRAHAM, Assistant Examiner

U.S. Cl. X.R.

212—129